(12) United States Patent
Sokolowski et al.

(10) Patent No.: US 7,793,434 B2
(45) Date of Patent: Sep. 14, 2010

(54) ARTICLE OF FOOTWEAR HAVING AN UPPER WITH A STRUCTURED INTERMEDIATE LAYER

(75) Inventors: Susan L. Sokolowski, Portland, OR (US); Susanne Amalie Wolf-Hochdoerffer, Portland, OR (US)

(73) Assignee: Nike, Inc., Beaverton, OR (US)

( * ) Notice: Subject to any disclaimer, the term of this patent is extended or adjusted under 35 U.S.C. 154(b) by 626 days.

(21) Appl. No.: 10/932,737

(22) Filed: Sep. 3, 2004

(65) Prior Publication Data

US 2006/0048413 A1     Mar. 9, 2006

(51) Int. Cl.
  *A43B 23/00*     (2006.01)
(52) U.S. Cl. .............................. 36/45; 36/12; 12/146 C
(58) Field of Classification Search .................. 36/45, 36/47, 12, 55; 12/146 C
  See application file for complete search history.

(56) References Cited

U.S. PATENT DOCUMENTS

| | | | |
|---|---|---|---|
| 1,828,320 A * | 10/1931 | Daniels ........................ | 36/3 A |
| 1,885,327 A * | 11/1932 | Burnham .................... | 264/257 |
| 1,949,159 A | 2/1934 | Glidden et al. | |
| 2,034,091 A * | 3/1936 | Dunbar ............................ | 36/4 |
| 2,622,052 A * | 12/1952 | Chandler ....................... | 36/45 |
| 3,583,081 A | 6/1971 | Hayashi | |
| 3,793,750 A * | 2/1974 | Bowerman .................. | 36/59 C |
| 4,447,967 A * | 5/1984 | Zaino ............................ | 36/45 |
| 4,508,582 A * | 4/1985 | Fink .............................. | 156/93 |
| 4,599,810 A * | 7/1986 | Sacre ............................. | 36/55 |
| 4,693,021 A | 9/1987 | Mazzarolo | |
| 4,845,862 A | 7/1989 | Phillips, Jr. et al. | |
| 4,858,339 A | 8/1989 | Hayafuchi et al. | |
| 5,647,150 A * | 7/1997 | Romanato et al. .......... | 36/117.1 |
| 5,746,013 A | 5/1998 | Fay, Sr. | |
| 5,802,740 A * | 9/1998 | Merk, Sr. ....................... | 36/55 |
| 5,804,011 A | 9/1998 | Dutta et al. | |
| 6,154,983 A * | 12/2000 | Austin et al. ................... | 36/12 |
| 6,319,864 B1 | 11/2001 | Hannigan et al. | |
| 6,401,364 B1 * | 6/2002 | Burt ............................. | 36/3 A |
| 6,482,492 B1 | 11/2002 | Hung | |
| 6,558,784 B1 | 5/2003 | Norton et al. | |
| 6,670,029 B2 | 12/2003 | Norton et al. | |

(Continued)

FOREIGN PATENT DOCUMENTS

EP         0 741 004         11/1996

(Continued)

OTHER PUBLICATIONS

International Search Report in corresponding PCT application, international application No. PCT/US2005/029060, mailed Dec. 2, 2005.

*Primary Examiner*—Marie Patterson
(74) *Attorney, Agent, or Firm*—Banner & Witcoff, Ltd.

(57) ABSTRACT

An article of footwear and a method of manufacturing the footwear are disclosed. The footwear has an upper and a sole structure. The upper is secured to sole structure and the upper is formed from three layers: a first layer, a second layer, and a third layer. The second layer is formed from a polymer material and molded to the first layer, but the second layer may alternately be molded to the third layer. The third layer is joined with at least one of the first layer and the second layer such that the second layer is positioned between the first layer and the third layer.

47 Claims, 12 Drawing Sheets

U.S. PATENT DOCUMENTS

| | | | |
|---|---|---|---|
| 6,851,205 B2 * | 2/2005 | Chen et al. | 36/55 |
| 7,047,668 B2 * | 5/2006 | Burris et al. | 36/3 A |
| 2001/0049886 A1 * | 12/2001 | Chen | 36/12 |
| 2002/0078599 A1 * | 6/2002 | Delgorgue et al. | 36/98 |
| 2002/0178610 A1 * | 12/2002 | Cheng | 36/3 A |
| 2003/0029058 A1 * | 2/2003 | Lin | 36/55 |
| 2004/0200094 A1 * | 10/2004 | Baychar | 36/55 |
| 2004/0216332 A1 * | 11/2004 | Wilson et al. | 36/55 |

FOREIGN PATENT DOCUMENTS

| | | |
|---|---|---|
| FR | 2 484 215 | 12/1981 |
| WO | WO 90/03744 | 4/1990 |

\* cited by examiner

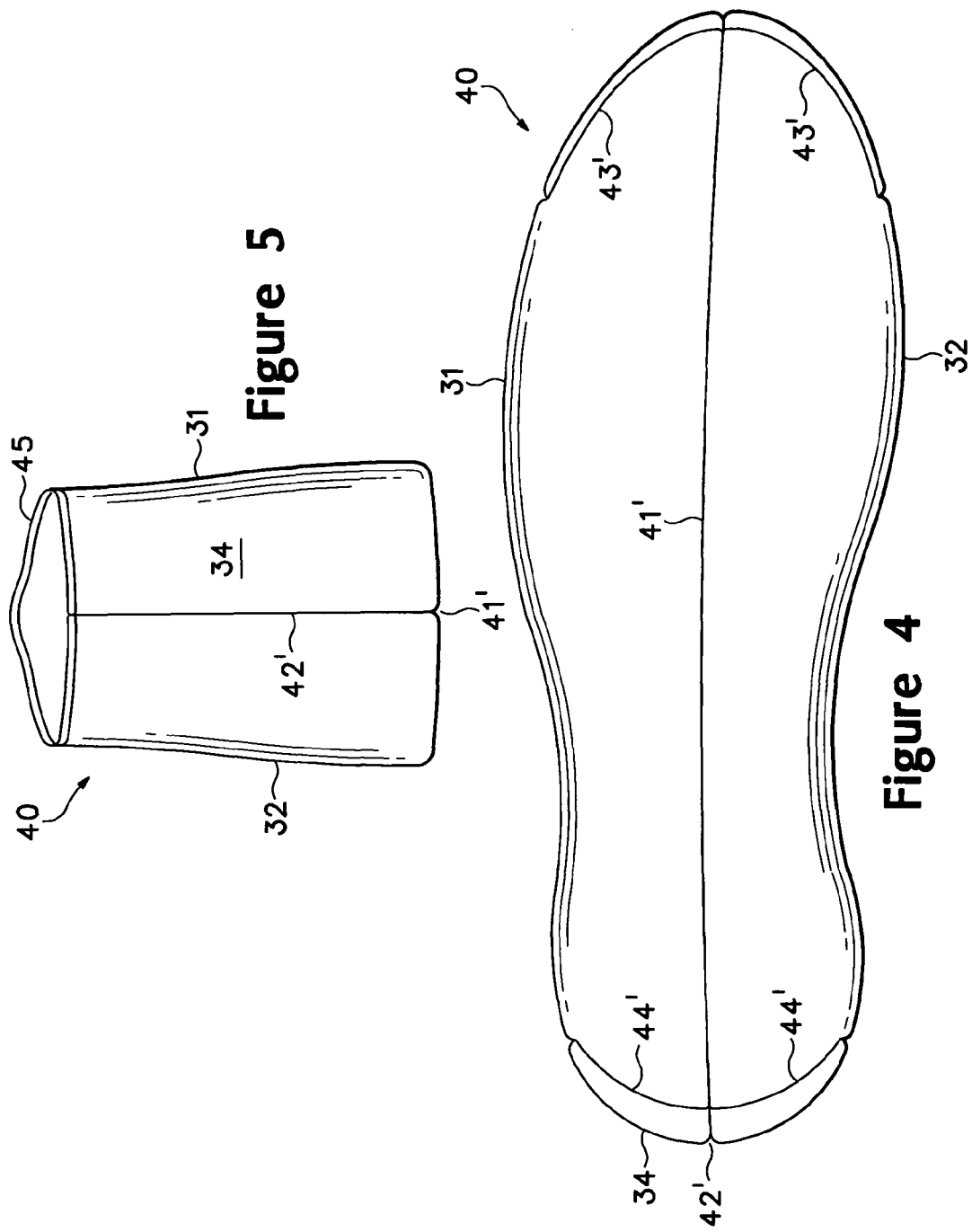

ARTICLE OF FOOTWEAR HAVING AN UPPER WITH A STRUCTURED INTERMEDIATE LAYER

BACKGROUND OF THE INVENTION

1. Field of the Invention

The present invention relates to footwear. The invention concerns, more particularly, an article of footwear having a structured intermediate layer extending through at least a portion of an upper of the footwear.

2. Description of Background Art

Conventional articles of athletic footwear generally include two primary elements, an upper and a sole structure. The upper is secured to the sole structure and forms a void on the interior of the footwear for comfortably and securely receiving a foot. The sole structure is positioned between the upper and the ground, and the sole structure may include a polymer foam midsole and an outsole. The midsole attenuates ground reaction forces (i.e., provides cushioning) as the footwear contacts the ground, and may absorb energy, to lessen the forces exerted upon the foot and leg. The outsole forms a ground-engaging portion of the sole structure and is formed from a durable and wear-resistant material. The sole structure may also include an insole that is positioned within the void to enhance footwear comfort.

The upper generally extends over the instep and toe areas of the foot, along the medial and lateral sides of the foot, and around the heel area of the foot. In some articles of footwear, such as basketball footwear and hiking boots, the upper may extend upward and around the ankle to provide support for the ankle. Access to the void on the interior of the footwear is generally provided by an access opening. A lacing system is often incorporated into the upper to selectively increase the size of the access opening and permit the wearer to modify certain dimensions of the upper, particularly girth, to accommodate feet with varying dimensions. In addition, the upper may include a tongue that extends under the lacing system to enhance comfort of the footwear, and the upper may incorporate a heel counter to limit movement of the heel.

Various materials are conventionally utilized in manufacturing the upper. The upper of athletic footwear, for example, may be formed from multiple material layers that include an exterior layer, an intermediate layer, and an interior layer. The materials forming the exterior layer of the upper may be selected based upon the properties of wear-resistance, flexibility, and air-permeability, for example. With regard to the exterior layer, the toe area and the heel area may be formed of leather, synthetic leather, or a rubber material to impart a relatively high degree of wear-resistance. Leather, synthetic leather, and rubber materials may not exhibit the desired degree of flexibility and air-permeability for various other areas of the exterior layer of the upper. Accordingly, the other areas of the exterior layer may be formed from a synthetic textile, for example. The exterior layer of the upper may be formed, therefore, from numerous material elements that each impart different properties to the upper. The intermediate layer of the upper is conventionally formed from a lightweight and planar polymer foam material that provides cushioning and enhances comfort. Similarly, the interior layer of the upper may be formed of a moisture-wicking textile that removes perspiration from the area immediately surrounding the foot. In some articles of athletic footwear, the various layers may be joined with an adhesive, and stitching may be utilized to join elements within a single layer or to reinforce specific areas of the upper.

SUMMARY OF THE INVENTION

The present invention is an article of footwear having an upper and a sole structure. The upper is secured to sole structure and the upper is formed from a plurality of layers that may include: a first layer, a second layer, and a third layer. In some embodiments of the invention, the first layer forms an exterior of the upper, and the third layer forms an interior of the upper. Alternately, the first layer may form an interior of the upper, and the third layer may form an exterior of the upper. In other embodiments, a fourth layer may be placed adjacent the third layer to form the interior of the upper. The second layer is formed from a polymer material, and the second layer is molded to the first layer. The third layer is joined with at least one of the first layer and the second layer such that the second layer is positioned between the first layer and the third layer.

The first layer may be a textile material such that the polymer material of the second layer infiltrates the textile material of the first layer to secure the second layer to the first layer. The second layer may have a mesh structure, or the second layer may be a plurality of discrete or joined polymer foam elements, for example. The third layer may be joined with at least one of the first layer and the second layer in a stitchless manner, such as with an adhesive.

The sole structure includes a midsole and an outsole, and the first layer and the second layer may extend between the midsole and the outsole. Depending upon the embodiment, at least one of the first layer and the second layer may also extend under the midsole, and the third layer may extend over the midsole.

In another aspect of the invention, the sole structure includes a midsole. Edges of the third layer may be joined together to form various seams. The insole effectively covers each of the seams, with the exception of a heel seam that may have a substantially vertical orientation and extends through a heel region of the footwear. Accordingly, the insole may provide a separation between each of the seams and the foot, with the exception of the heel seam.

Yet another aspect of the invention involves a method of manufacturing an article of footwear. The method includes providing a first layer of an upper of the article of footwear, and molding a second layer of the upper to the first layer. A third layer of the upper is then joined with at least one of the first layer and the second layer such that the second layer is positioned between the first layer and the third layer.

The advantages and features of novelty characterizing the present invention are pointed out with particularity in the appended claims. To gain an improved understanding of the advantages and features of novelty, however, reference may be made to the following descriptive matter and accompanying drawings that describe and illustrate various embodiments and concepts related to the invention.

DESCRIPTION OF THE DRAWINGS

The foregoing Summary of the Invention, as well as the following Detailed Description of the Invention, will be better understood when read in conjunction with the accompanying drawings.

FIG. 4 is a bottom plan view of the interior layer in an assembled configuration.

FIG. 5 is a rear elevational view of the interior layer in the assembled configuration.

DETAILED DESCRIPTION OF THE INVENTION

The following discussion and accompanying figures disclose two articles of footwear in accordance with the present invention. Concepts related to the articles of footwear may be applied to a wide range of footwear styles. For example, the concepts may be applied to athletic footwear styles that include running shoes, basketball shoes, walking shoes, cross-training shoes, tennis shoes, soccer shoes, and football shoes, for example. In addition to athletic footwear, concepts related to the articles of footwear may be applied to footwear styles that are generally considered to be non-athletic (e.g., dress shoes or work boots) or footwear serving a medical or rehabilitative purpose. Accordingly, one skilled in the relevant art will appreciate that the concepts disclosed herein apply to a wide variety of footwear styles, in addition to the specific style discussed in the following material and depicted in the accompanying figures.

Figure 1:
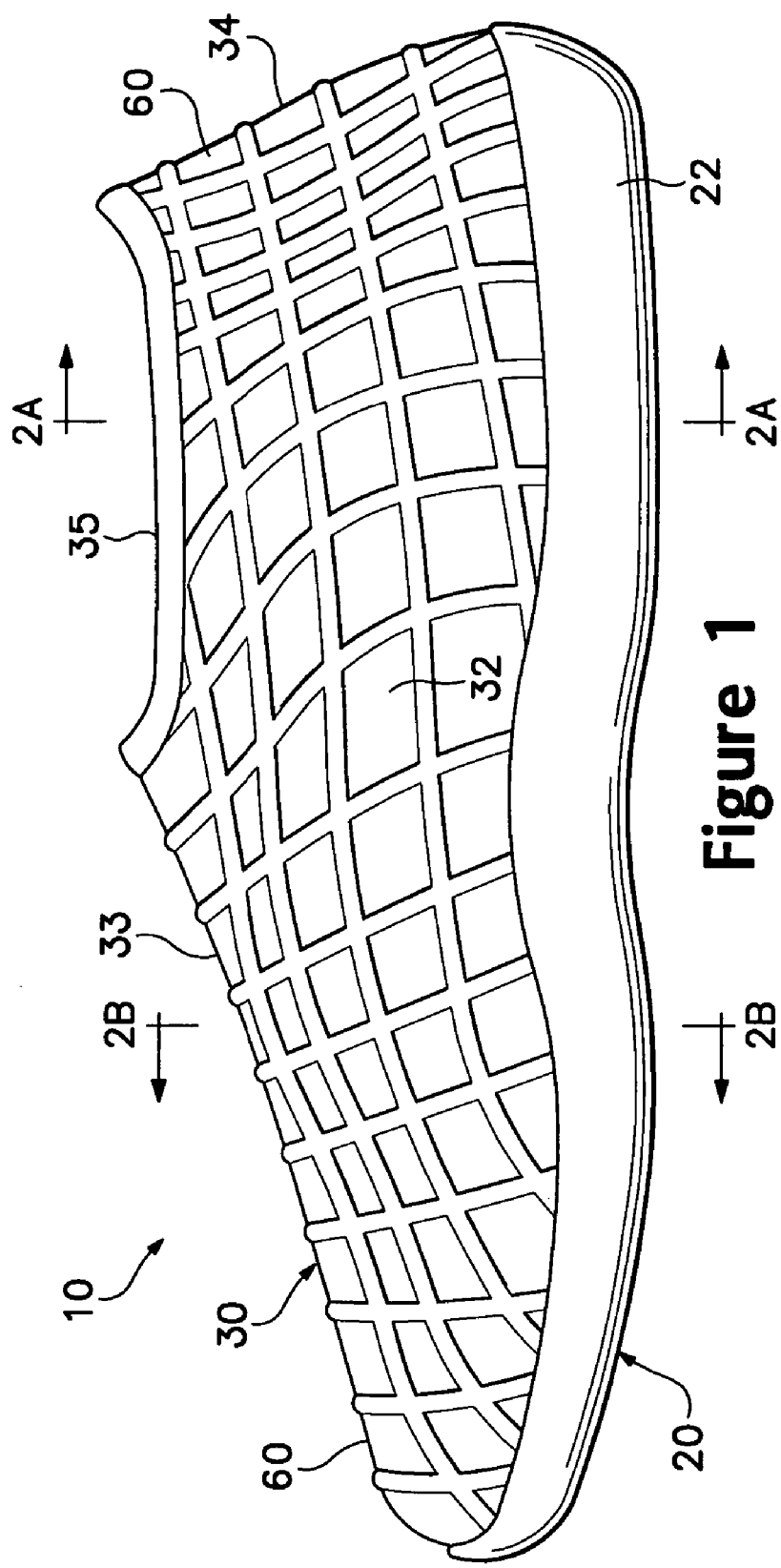
FIG. 1 is a medial side elevational view of a first article of footwear in accordance with the present invention.
Figure 2A:
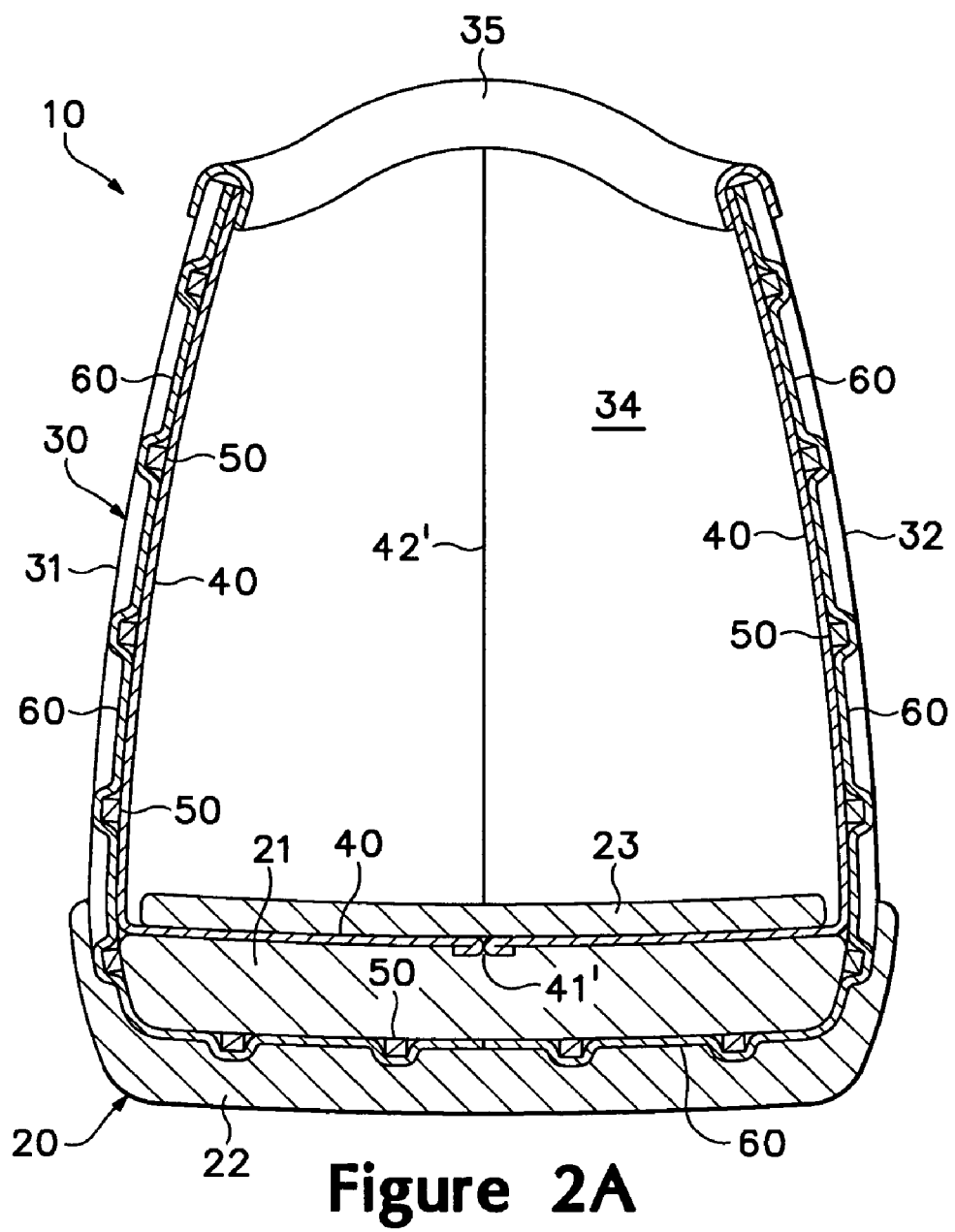
FIG. 2A is a first cross-sectional view of the first article of footwear, as defined by section line 2A-2A in FIG. 1.
Figure 2B:
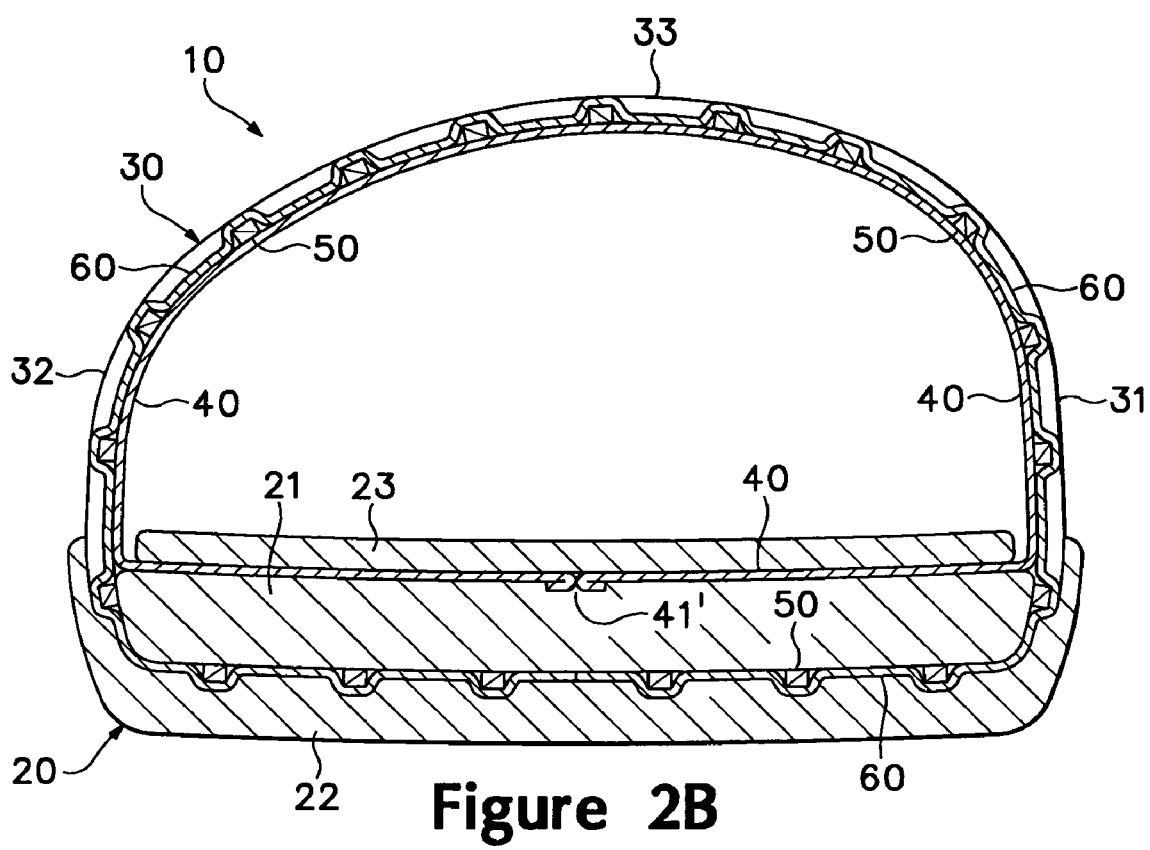
FIG. 2B is a second cross-sectional view of the first article of footwear, as defined by section line 2B-2B in FIG. 1.

An article of footwear 10, in accordance with the present invention, is depicted in FIGS. 1-2B as incorporating a sole structure 20 and an upper 30. Sole structure 20 is secured to upper 30 and provides a durable, wear-resistant component that provides cushioning as footwear 10 impacts the ground. Upper 30 is formed from an interior layer 40, an intermediate layer 50, and an exterior layer 60 that are joined in a stitchless manner and positioned in an at least partially coextensive relationship. That is, portions of layers 40, 50, and 60 are arranged in a laminar manner. As will be described in greater detail below, intermediate layer 50 is positioned between interior layer 40 and exterior layer 60, and intermediate layer 50 may exhibit a structured configuration. In further embodiments of the invention additional layers may be placed on either side of upper 30 such that the additional layers actually form the interior or exterior surface of upper 30.

Sole structure 20 exhibits a generally conventional configuration that may include a midsole 21 and an outsole 22. Midsole 21 is formed of a polymer foam material, such as ethylvinylacetate or polyurethane. Accordingly, midsole 21 attenuates ground reaction forces (i.e., provides cushioning) and may absorb energy as sole structure 20 is compressed between the foot and the ground. To enhance the force attenuation and energy absorption characteristics of sole structure 20, midsole 21 may incorporate a fluid-filled bladder, as disclosed in U.S. Pat. Nos. 4,183,156 and 4,219,945 to Rudy, for example. Outsole 22 exhibits a generally cupped configuration that extends over the lower surface of midsole 21 and along side surfaces of midsole 21. Suitable materials for outsole 22 are various rubber compounds, for example, that provide a durable, wear-resistant surface for engaging the ground. Outsole 22 may also incorporate a textured lower surface to enhance the traction characteristics of footwear 10. In addition, footwear 10 includes an insole 23, which is a relatively thin cushioning member located within upper 30 and adjacent to a plantar surface of the foot for enhancing the comfort of footwear 10.

For purposes of reference, upper 30 includes a lateral region 31, an opposite medial region 32, an instep region 33, and a heel region 34. Regions 31-34 are not intended to demarcate precise areas of upper 30. Rather, regions 31-34 are intended to represent general areas of upper 30 to aid in the following discussion. In addition to upper 30 generally, references to the various regions 31-34 may also be applied to each of layers 40, 50, and 60. Lateral region 31 extends through a longitudinal length of footwear 10 and is generally configured to contact and cover a lateral side of the foot. Medial region 32 has a similar configuration that generally corresponds with a medial side of the foot. Instep region 33 is positioned between lateral region 31 and medial region 32, and instep region 33 extends over an instep area of the foot. Heel region 34 forms a rear portion of upper 30 and is generally configured to contact and cover a heel area of the foot. In addition, lateral region 31, medial region 32, instep region 33, and heel region 34 cooperatively define an access opening 35 for providing the foot with access to the void within upper 30.

Layers 40, 50, and 60 of upper 30 effectively extend around midsole 21, as depicted in FIGS. 2A and 2B. More particularly, layers 40, 50, and 60 are positioned in a coextensive relationship in regions 31-34. At a point where layers 40, 50, and 60 approach midsole 21, however, interior layer 40 diverges from the coextensive relationship with intermediate layer 50 and exterior layer 60 to extend over an upper surface of midsole 21. Intermediate layer 50 and exterior layer 60 continue downward and extend between midsole 21 and outsole 22 to cover a lower surface of midsole 21. That is, layers 40, 50, and 60 effectively wrap around each of the surfaces of midsole 21, with interior layer 40 extending over the upper surface of midsole 21 and each of intermediate layer 50 and exterior layer 60 extending between midsole 21 and outsole 22 to cover a lower surface of midsole 21. In other embodiments of the invention, each of layers 40, 50, and 60 may extend over the upper surface of midsole 21, each of layers 40, 50, and 60 may extend between midsole 21 and outsole 22 to cover a lower surface of midsole 21, or upper 30 may be joined in another manner to sole structure 20. Accordingly, the manner in which sole structure 20 and upper 30 are joined may vary significantly within the scope of the present invention.

Interior layer 40 extends over the upper surface of midsole 21 and effectively forms a substantial portion of the void within upper 30. More particularly, an exposed surface of interior layer 40 (i.e., the surface opposite layers 50 and 60) defines the void within upper 30, which receives both insole 23 and the foot. In general, therefore, insole 23 is located within a lower portion of upper 30 and is positioned in an area that will be adjacent to a plantar surface of the foot for enhancing the comfort of footwear 10. As will be described in greater detail below, edges of interior layer 40 are joined together to form seams, and insole 23 effectively covers the seams (except a heel seam) and separates the seams from the foot. That is, insole 23 is located within the void formed by interior layer 40, and insole 23 is positioned between the seams and the portion of the void that receives the foot. Accordingly, insole 23 provides a separation between the various seams and the foot, with the exception of the heel seam. In some embodiments of the present invention, additional layers of material may be placed adjacent to interior layer 40 such that the additional layers actually form the interior surface of the void within upper 30.

Interior layer 40 and exterior layer 60 may be formed from a variety of materials, including textile materials. A textile may be defined as any manufacture from fibers, filaments, or yarns characterized by flexibility, fineness, and a high ratio of length to thickness. Textiles generally fall into two categories. The first category includes textiles produced directly from webs of filaments or fibers by random interlocking to construct non-woven fabrics and felts. The second category includes textiles formed through a mechanical manipulation of yarn, thereby producing a woven fabric, for example. The various techniques for mechanically manipulating yarn into a textile include interweaving, intertwining and twisting, and interlooping, which includes various knitting processes. Yarn is defined as an assembly having a substantial length and relatively small cross-section that is formed of at least one filament, a plurality of filaments, or a plurality of fibers.

The structure of textile materials is generally porous and permits molten polymers, for example, to infiltrate the structure of interior layer 40 and exterior layer 60. In manufacturing upper 30, exterior layer 60, for example, is placed in a mold and a polymer material is injected, poured, compressed, or otherwise placed into the mold. The polymer material infiltrates the textile material of exterior layer 60 (i.e., the polymer material extends around the various filaments and fibers forming the yarn in the textile material) and, is permanently bonded to exterior layer 60 upon cooling. That is, the polymer material that forms intermediate layer 50 may be molded to exterior layer 60. In other embodiments of the invention, the polymer material forming intermediate layer 50 may be molded to interior layer 40. Suitable polymer materials for intermediate layer 50 include silicone, various rubbers, and polyurethane, for example. Although interior layer 40 and exterior layer 60 are generally discussed herein as being textile materials, one or both of interior layer 40 and exterior layer 60 may be formed from any material to which intermediate layer 50 may be bonded. In addition, intermediate layer 50 may be formed from multiple materials, or intermediate layer 50 may be formed from a single material with different densities in different portions of footwear 10. Accordingly, the properties of the materials forming intermediate layer 50 may also vary to change the properties of intermediate layer 50 in different portions of footwear 10.

The molding process described above effectively joins intermediate layer 50 to exterior layer 60. A portion of interior layer 40 is positioned adjacent to intermediate layer 50 and is also secured to intermediate layer 50 and exterior layer 60. One suitable manner of joining interior layer 40 with intermediate layer 50 and exterior layer 60 is through an adhesive bonding process. An adhesive may be applied to interior layer 40, and upon contact with intermediate layer 50 and exterior layer 60, the adhesive joins interior layer 40 to intermediate layer 50 and exterior layer 60. Alternately, the adhesive may be applied to intermediate layer 50 and exterior layer 60, or other joining techniques may be utilized (e.g., stitching or thermo-bonding).

Figure 3:
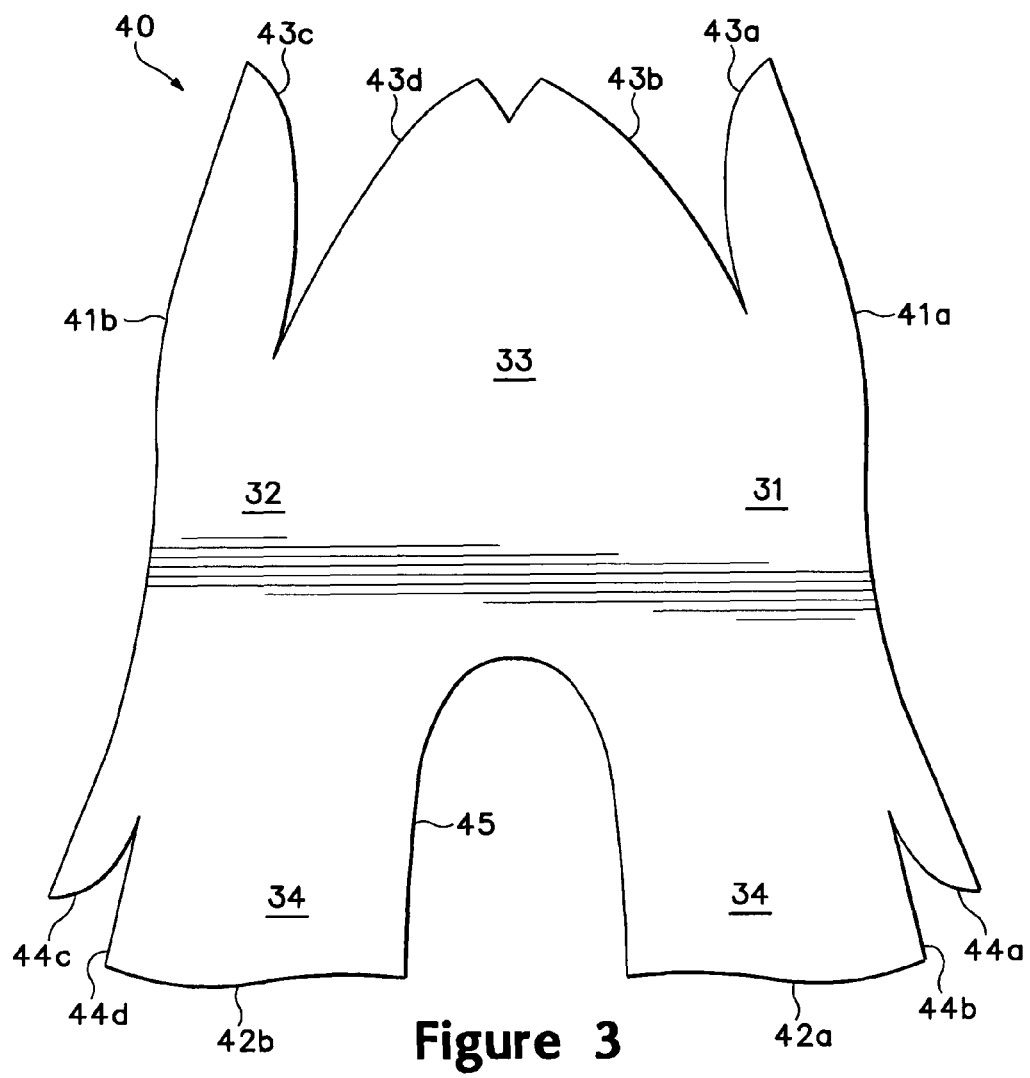
FIG. 3 is a top plan view of a material element that forms an interior layer of an upper of the first article of footwear.

The manner in which footwear 10 is manufactured will now be discussed in detail to provide a better understanding regarding the structure of footwear 10. With reference to FIG. 3, interior layer 40 is depicted as a single textile element that is formed to exhibit a unitary (i.e., one piece) construction having a plurality of edges 41*a*, 41*b*, 42*a*, 42*b*, 43*a*, 43*b*, 43*c*, 43*d*, 44*a*, 44*b*, 44*c*, and 44*d*. A plurality of corresponding seams 41', 42', 43', and 44' are respectively formed, therefore, when joining the edges of interior layer 40. More particularly, seam 41' extends along the longitudinal length of a lower area and is centrally-located with respect to lateral region 31 and medial region 32. Seam 42' is also centrally-located and extends in a substantially vertical direction along heel region 34. A seam 43' is positioned in a forefoot area of upper 30 and joins a portion of the lower region with both of lateral region 31 and medial region 32. In addition, a seam 44' is positioned in a rear area of upper 30 and joins a portion of the lower region with heel region 34. As defined for purposes of the present invention, the term unitary construction is intended to express a configuration wherein portions of a textile element (i.e., layers 40 and 60) are not joined together by seams or other connections, as depicted with interior layer 40 in FIG. 3. Although the various edges 41*a*-44*d* are joined together to form seams 41'-44', the various portions of interior layer 40 are formed as an unitary (i.e., one piece) element without seams.

Interior layer 40 exhibits the general shape depicted in FIG. 3 prior to the formation of seams 41'-44'. Following formation of seams 41'-44', however, interior layer 40 exhibits the shape depicted in FIGS. 4 and 5. Seams 41'-44' are formed by securing various edges of interior layer together. More specifically, (1) seam 41' is formed by securing edge 41*a* with edge 41*b*; (2) seam 42' is formed by securing edge 42*a* with edge 42*b*; (3) a first portion of seam 43' is formed by securing edge 43*a* with edge 43*b* (4) a second portion of seam 43' is formed by securing edge 43*c* with edge 43*d*; (5) a first portion of seam 44' is formed by securing edge 44*a* with edge 44*b*; and (6) a second portion of seam 44' is formed by securing edge 44*c* with edge 44*d*. Referring to FIGS. 3-5, the positions of regions 31-34 are identified to provide a frame of reference relating to the various portions of interior layer 40. In some embodiments, the order of the various steps discussed herein may be altered.

In order to join edges 41*a* and 41*b* to form seam 41', interior layer 40 is folded or otherwise overlapped such that edge 41*a* is placed adjacent to edge 41*b*. Stitching, an adhesive, or thermo-bonding, for example, is then utilized to secure edge 41*a* and edge 41*b*. Textile element 40, as depicted in FIG. 3, has a generally planar or otherwise flat configuration. Upon the formation of seam 41', however, one portion of textile element 40 generally overlaps the other portion of textile element 40. The volume between the overlapping portions effectively forms the void within upper 30 for receiving the foot and insole 23.

The folding or overlapping of interior layer 40 to form seam 41' places edge 42*a* adjacent to edge 42*b*, which facilitates the formation of seam 42'. With reference to FIG. 3, an edge 45 forms a generally u-shaped area in a portion of textile element 40. Upon the joining of edges 42*a* and 42*b* to form seam 42', the u-shaped area becomes an aperture in interior layer 40 and effectively forms access opening 35. Each of edges 43*a*-43*d* and edges 44*a*-44*d* are formed from a generally v-shaped area of textile element 40. Accordingly, seams 43' and 44' may be formed by closing the v-shaped areas and securing the various edges together.

Figure 6:
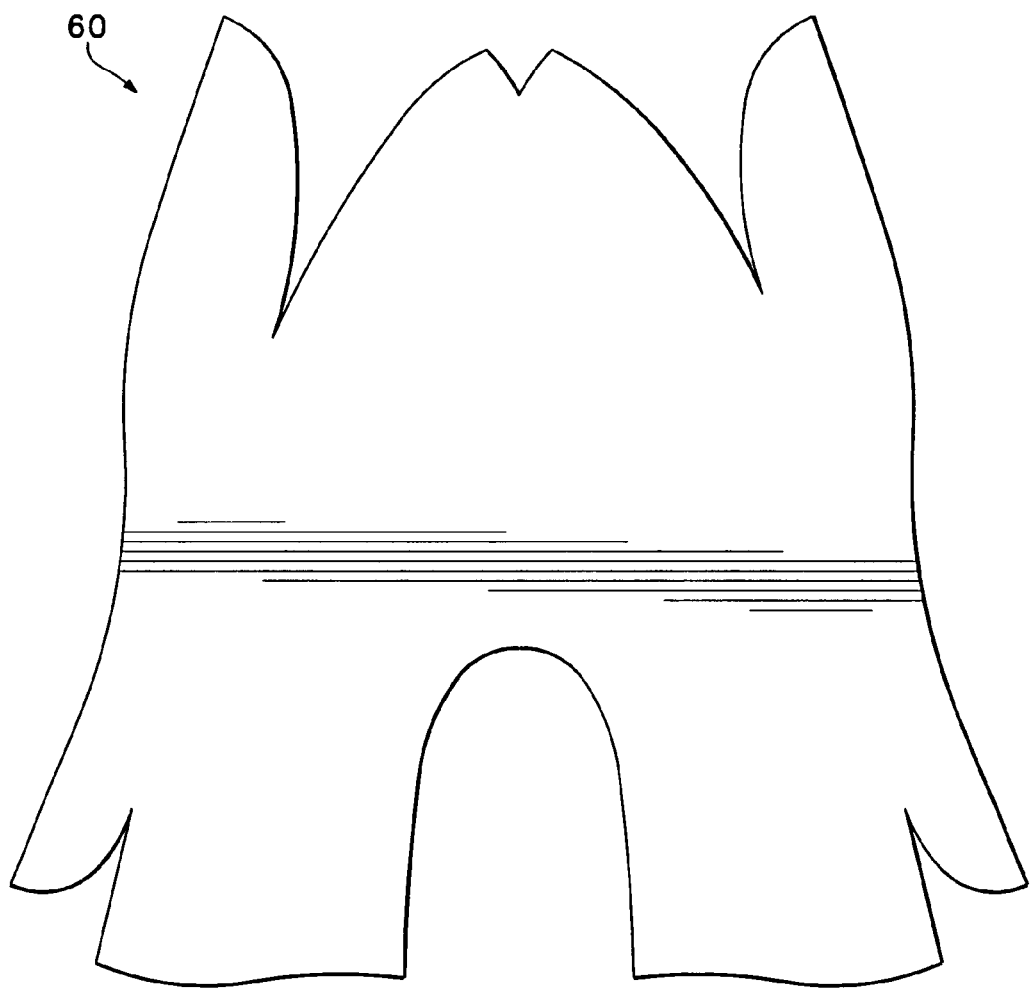
FIG. 6 is a top plan view of a material element that forms an exterior layer of the upper of the first article of footwear.
Figure 7:
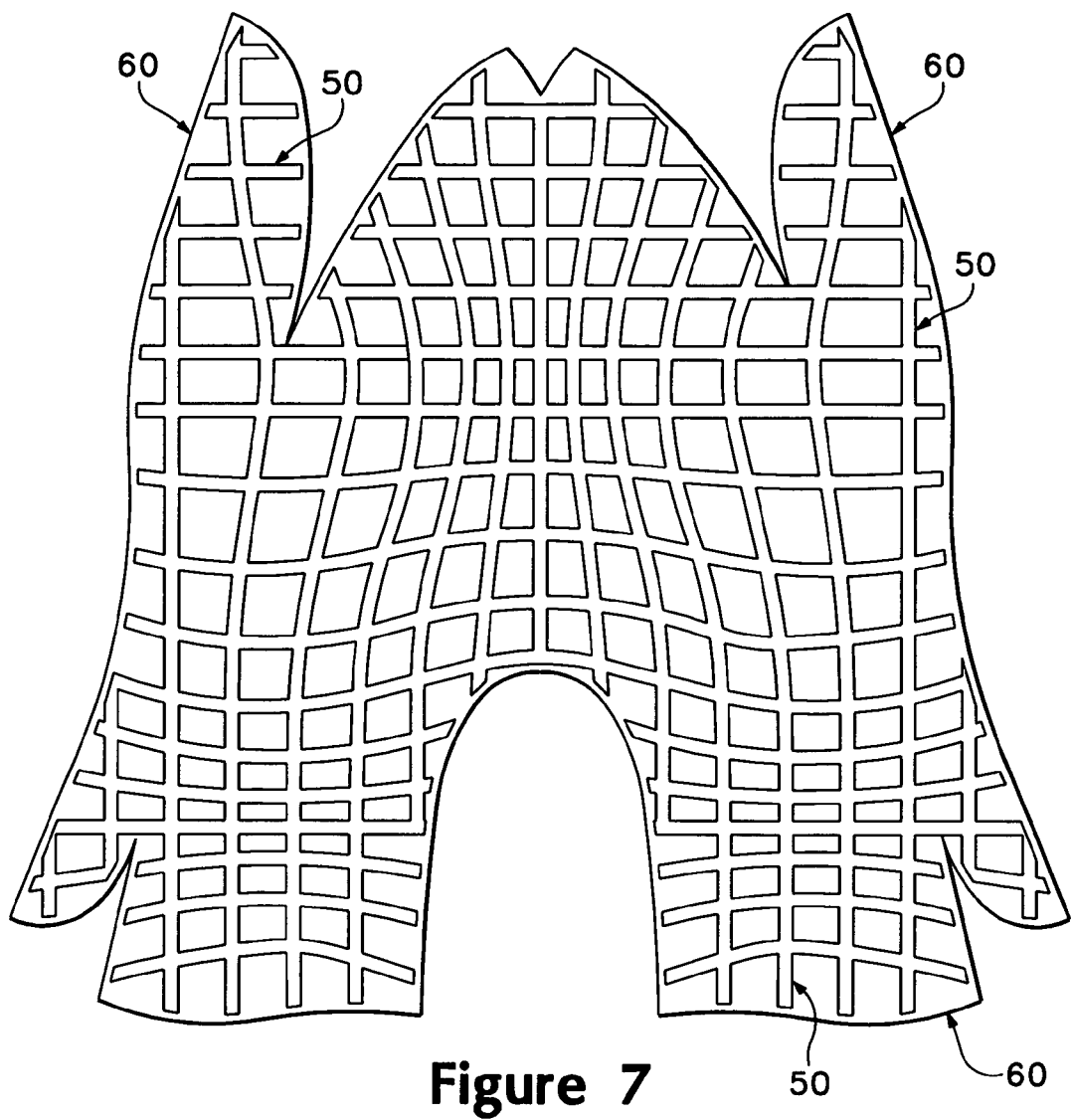
FIG. 7 is a top plan view of an intermediate layer in combination with the exterior layer.

Following the formation of each of seams 41'-44', which may be performed around a last having the general shape of a foot, the lower area of interior layer 40 is then secured to midsole 21 with an adhesive, for example. Separately, exterior layer 60 may be formed, as depicted in FIG. 6. Exterior layer 60 exhibits the general shape of interior layer 40, but has greater dimensions in order to wrap around the lower surface of midsole 21. Either prior to removing exterior layer 60 from a larger textile element or following removal, exterior layer 60 may be placed within a mold for purposes of forming intermediate layer 50. As discussed above, exterior layer 60 is placed in a mold and a polymer material is injected into the mold. The polymer material infiltrates the textile material of exterior layer 60 (i.e., the polymer material extends around the various filaments and fibers forming the yarn in the textile material) and, is permanently bonded to exterior layer 60 upon cooling. That is, the polymer material that forms intermediate layer 50 may be molded to exterior layer 60, as depicted in FIG. 7.

The combination of intermediate layer 50 and exterior layer 60 is then placed over interior layer 40, which remains on the last, and portions of intermediate layer 50 and exterior layer 60 extend around midsole 21 to cover the lower surface of midsole 21. In order to join interior layer 40 to the combination of intermediate layer 50 and exterior layer 60, an adhesive may be applied to interior layer 40 prior to placing the combination of intermediate layer 50 and exterior layer 60 over interior layer 40. Alternately, the adhesive may be applied to a surface of the combination of intermediate layer 50 and exterior layer 60. As discussed above, other methods, such as stitching and thermo-bonding, may also be utilized to join interior layer 40 to the combination of intermediate layer 50 and exterior layer 60. Furthermore, layers 40, 50, and 60 may be joined prior to the lasting process, or different orders for joining layers 40, 50, and 60 may be utilized within the scope of the present invention.

The combination of intermediate layer 50 and exterior layer 60 exhibit the general shape of interior layer 40, but have greater dimensions in order to wrap around the lower surface of midsole 21. Given the similarities in shape between interior layer 40 and the combination of intermediate layer 50 and exterior layer 60, seams that correspond in location with seams 41'-44' may be formed in the combination of intermediate layer 50 and exterior layer 60. That is, edges of the combination of intermediate layer 50 and exterior layer 60 may be joined in a manner that is analogous to the edges of interior layer 40.

Following the general procedure outlined above, outsole 22 may be bonded to portions of the combination of intermediate layer 50 and exterior layer 60 that extend around midsole 21. The last is then removed from the void formed by interior layer 40, and insole 23 is then positioned within a lower are of the void. In addition, various finishing steps, such as reinforcing access opening 35, may be performed to place footwear 10 in a commercially-presentable state, thereby substantially completing the manufacture of footwear 10.

Based upon the above discussion, footwear 10 is structured such that upper 30 forms a void for receiving the foot and insole 23. Upper 30 includes interior layer 40, intermediate layer 50, and exterior layer 60, and intermediate layer 50 is formed from a polymer material that is molded to exterior layer 60 (or may be molded to interior layer 40). Interior layer 40 is joined with at least one of intermediate layer 50 and exterior layer 60 such that intermediate layer 50 is positioned between exterior layer 60 and interior layer 40. Sole structure 20 secured to upper 30, and intermediate layer 50 and exterior layer 60 extend between midsole 21 and outsole 22. In addition, interior layer 40 extends over midsole 21. As discussed above, this manner of securing upper 30 to sole structure 20 provides one example of many suitable joining configurations.

Edges of interior layer 40 are joined together to form various seams 41'-44', as discussed above. Insole 23 effectively covers each of seams 41', 43', and 44', but does not cover seam 42', which is substantially vertical and extends through heel region 34. With the exception of seam 42', therefore, insole 23 separates each of seams 41'-44' from the foot. That is, insole 23 is located within the void formed by interior layer 40, and insole 23 is positioned between each of seams 41', 43', and 44' and the portion of the void that receives the foot. Accordingly, insole 23 provides a separation between each of seams 41'-44' and the foot, with the exception of the substantially vertical seam 42' in heel region 34.

Interior layer 40 forms an interior surface of the upper that defines substantially all of the void. Exterior layer 60 and interior layer 40 may be textile materials, and the polymer material of intermediate layer 50 infiltrates the textile material of exterior layer 60 to secure intermediate layer 50 to exterior layer 60. In addition, interior layer 40 is joined with at least one of intermediate layer 50 and exterior layer 60. In some embodiments, a stitchless manner of joining interior layer 40 to the combination of intermediate layer 50 and exterior layer 60 is utilized. Accordingly, an adhesive or thermo-bonding is suitable. In some embodiments, however, stitching may be utilized to join interior layer 40 to the combination of intermediate layer 50 and exterior layer 60.

Intermediate layer 50 may have a variety of configurations within the scope of the present invention. As depicted in the figures, intermediate layer 50 has a mesh structure that forms a plurality of generally rectangular openings. Alternately, intermediate layer 50 may have a mesh structure that forms round, triangular, hexagonal, trapezoidal, or irregularly-shaped openings. In some embodiments, intermediate layer 50 may form a non-mesh structure. For example, the polymer material may form strips that run vertically, horizontally, or diagonally between interior layer 40 and exterior layer 60. The polymer material may also be limited to specific regions of upper 30. For example, the polymer material of intermediate layer 50 may be limited to heel region 34, or may extend through instep region 33 to reinforce this area of upper 30.

Figure 8:
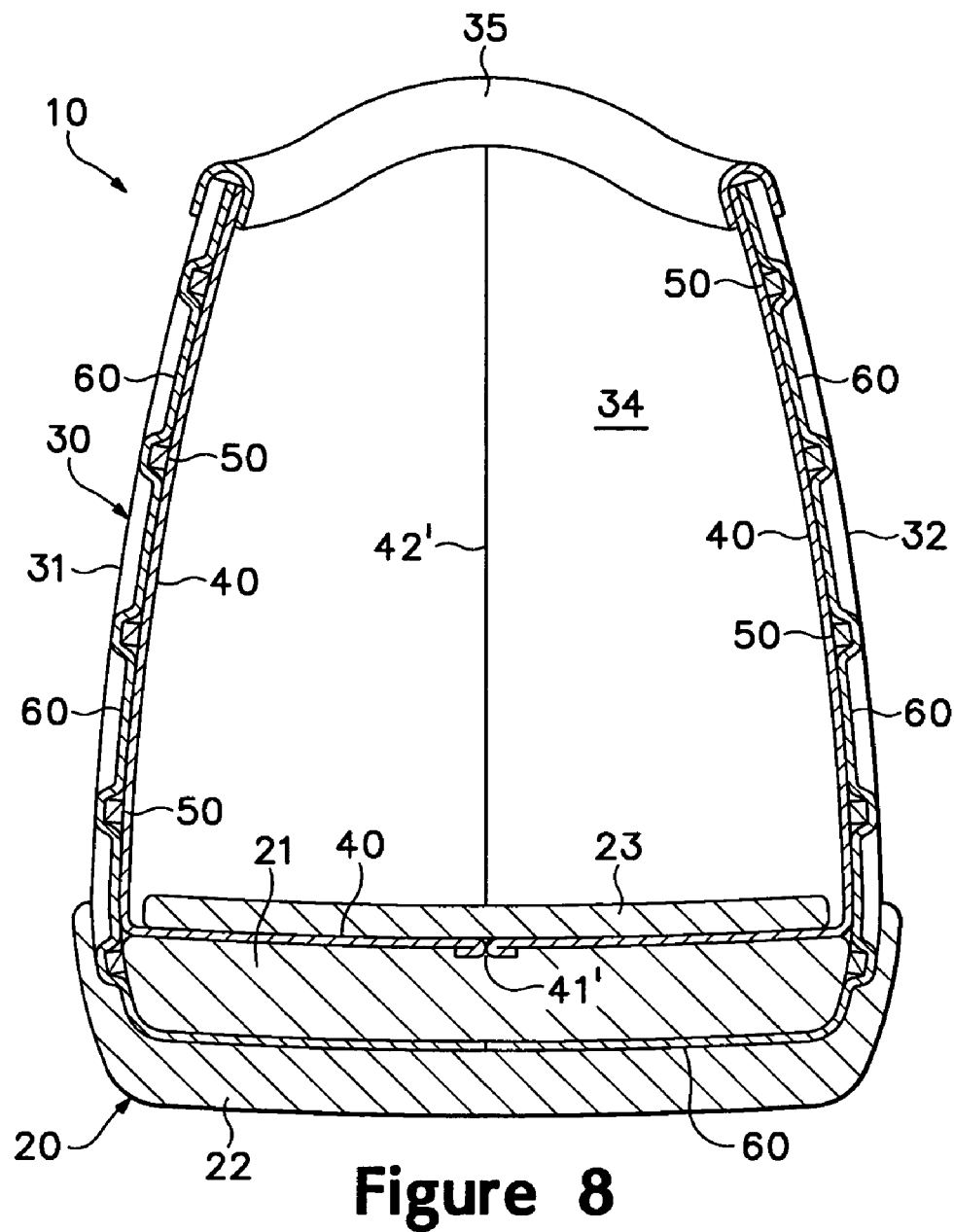
FIG. 8 is a cross-sectional view that corresponds with the cross-sectional view of FIG. 2A and depicts another embodiment of the first article of footwear.

An advantage of the mesh structure of intermediate layer 50 relates to directional stretch-resistance in the plane of upper 30, and flexibility in other directions. Effectively, the mesh structure limits the degree of stretch in upper 30, but allows upper 30 to freely flex. In some embodiments, the dimensions of the mesh structure of intermediate layer 50 may vary throughout upper 30. For example, the size of the openings in the mesh structure may be varied depending upon the desired degree of stretch in each area of upper 30. The thickness of the individual segments of the mesh structure may also be varied to control the degree of stretch in specific areas of upper 30. Intermediate layer 50 may also be utilized to provide structural elements in upper 30. For example, intermediate layer 50 may be utilized to form a heel counter in heel region 34, or intermediate layer 50 may be utilized to reinforce apertures through which a shoelace is threaded. Intermediate layer 50 is discussed above as wrapping around the lower surface of midsole 21. In some embodiments, however, intermediate layer 50 may wrap around midsole 21 to a lesser degree, as depicted in FIG. 8 or intermediate layer 50 may be limited to portions of upper 30 that are not associated with sole structure 20. Accordingly, the specific structure of intermediate layer 50 may vary significantly within the scope of the present invention. Another advantage to the mesh structure of intermediate layer 50 relates to aesthetics. For this reason, intermediate layer 50 may be molded or otherwise formed to exhibit any practical and aesthetically-pleasing structure, whether having a mesh or non-mesh configuration.

Figure 9:
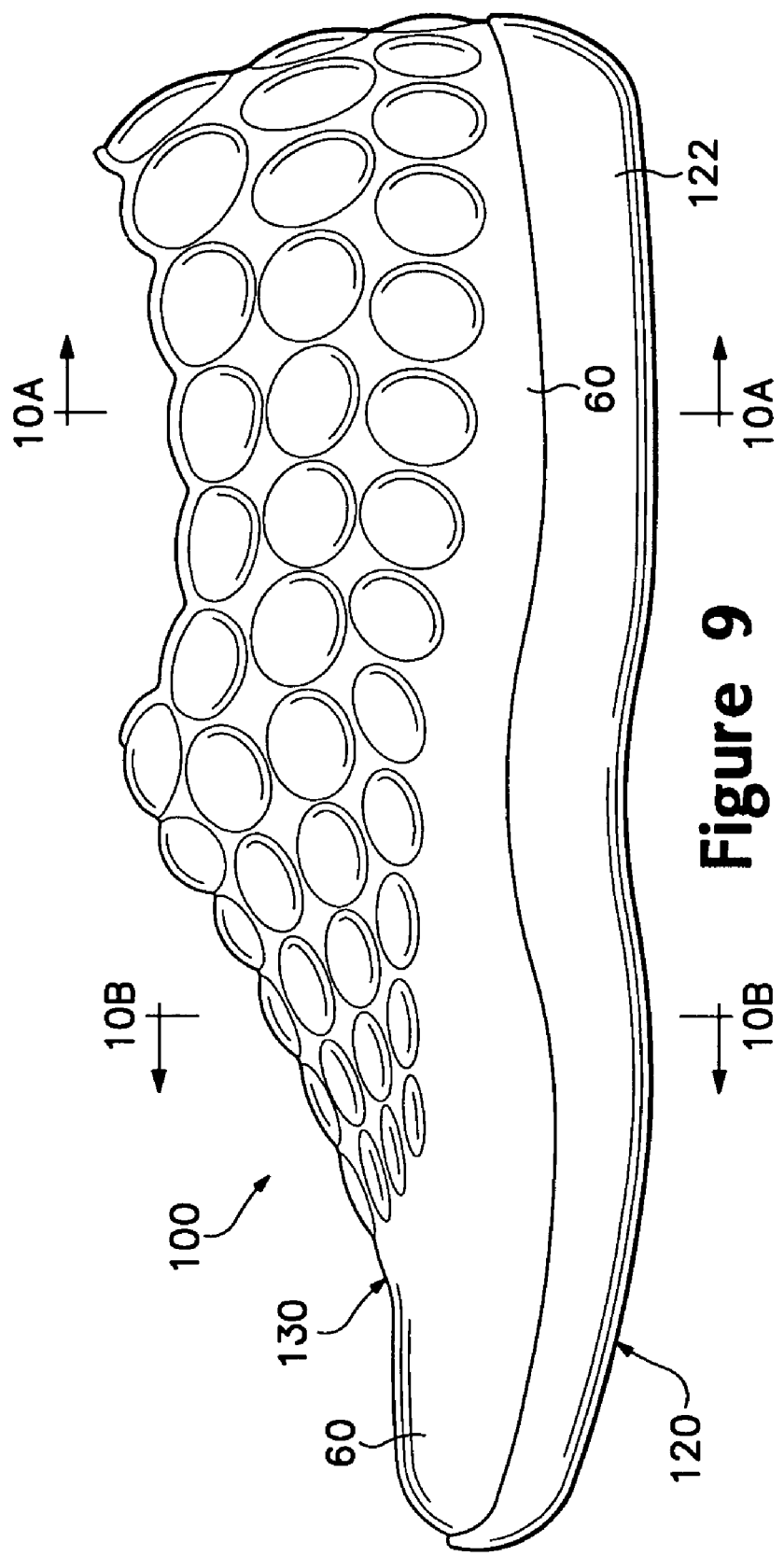
FIG. 9 a medial side elevational view of a second article of footwear having another upper in accordance with the present invention.
Figure 10A:
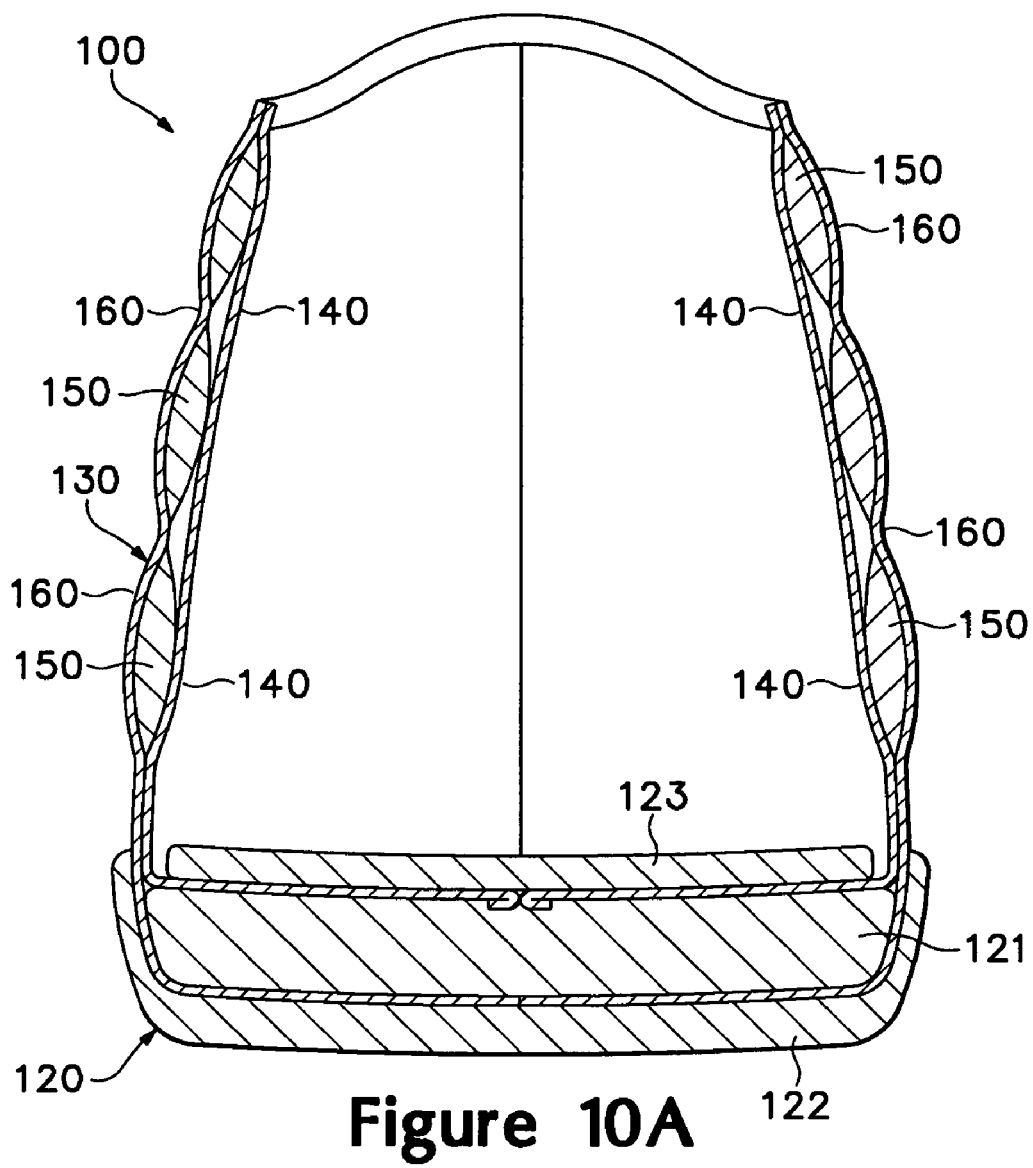
FIG. 10A is a first cross-sectional view of the second article of footwear, as defined by section line 10A-10A in FIG. 9.
Figure 10B:
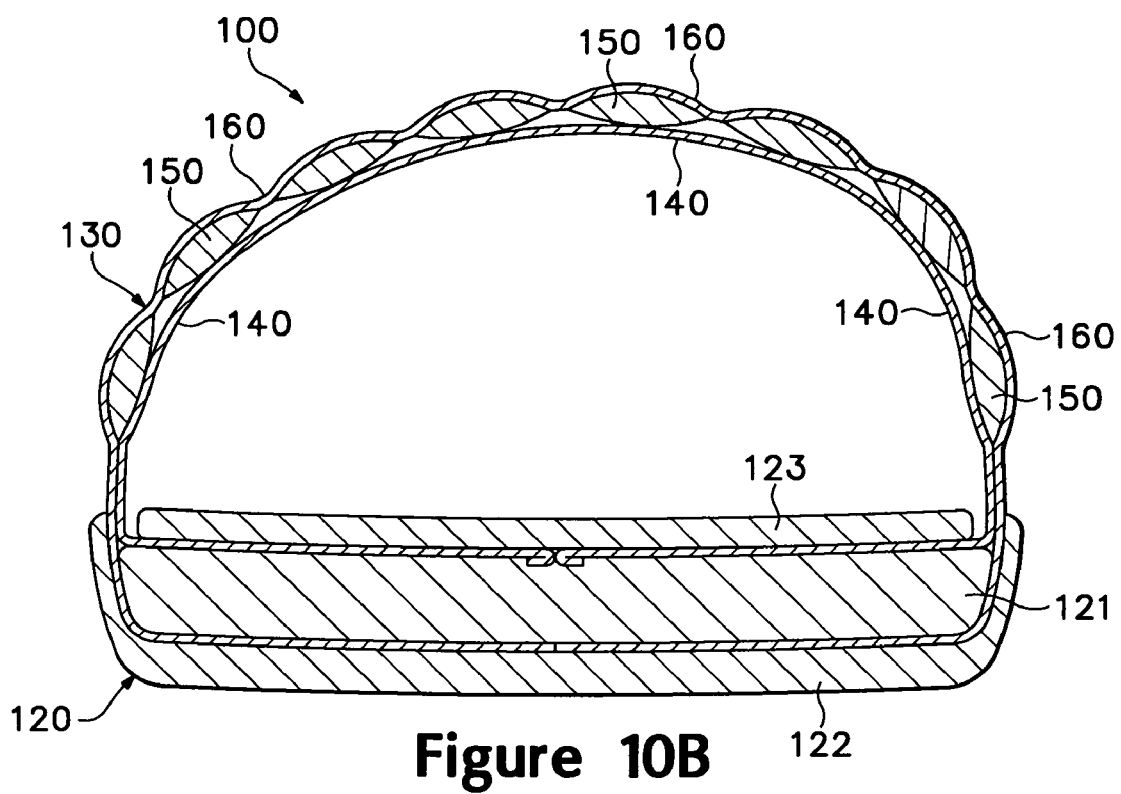
FIG. 10B is a second cross-sectional view of the second article of footwear, as defined by section line 10B-10B in FIG. 9.

An article of footwear 100, in accordance with the present invention, is depicted in FIGS. 9-10B as incorporating a sole structure 120 and an upper 130. Sole structure 120 is secured upper 130 and provides a durable, wear-resistant component that provides cushioning as footwear 100 impacts the ground. Upper 130 is formed from an interior layer 140, an intermediate layer 150, and an exterior layer 160 that are joined in a stitchless manner and are positioned in an at least partially coextensive relationship. As will be described in greater detail below, intermediate layer 150 is positioned between interior layer 140 and exterior layer 160, and intermediate layer 150 may exhibit a structured configuration.

Sole structure 120 exhibits a generally conventional configuration that includes a midsole 121 and an outsole 122. Midsole 121 is formed of a polymer foam material, such as ethylvinylacetate or polyurethane. Accordingly, midsole 21 attenuates ground reaction forces (i.e., imparts cushioning) and may absorb energy as sole structure 120 is compressed between the foot and the ground. Outsole 122 exhibits a generally cupped configuration that extends over the lower surface of midsole 121 and along side surfaces of midsole 121. Suitable materials for outsole 122 are various rubber compounds, for example, that provide a durable, wear-resistant surface for engaging the ground. Outsole 122 may also incorporate a textured lower surface to enhance the traction characteristics of footwear 100. In addition, footwear 100 includes an insole 123, which is a relatively thin, cushioning member located within upper 130 and adjacent to a plantar surface of the foot for enhancing the comfort of footwear 100.

Layers 140, 150, and 160 of upper 130 effectively extend around midsole 121, as depicted in FIGS. 10A and 10B. More particularly, interior layer 140 diverges from a coextensive relationship with intermediate layer 150 and exterior layer 160 to extend over an upper surface of midsole 121. Exterior layer 160 continues downward and extends between midsole 121 and outsole 122 to cover a lower surface of midsole 121. In contrast with footwear 10, therefore, intermediate layer 150 is not depicted as extending between midsole 121 and outsole 122. In other embodiments of the invention, each of layers 140, 150, and 160 may extend over the upper surface of midsole 121, each of layers 140, 150, and 160 may extend between midsole 121 and outsole 122 to cover a lower surface of midsole 21, or upper 130 may be joined in another manner to sole structure 120. Accordingly, the manner in which sole structure 120 and upper 130 are joined may vary significantly within the scope of the present invention.

Interior layer 140 extends over the upper surface of midsole 121 and effectively forms a substantial portion of the void within upper 130. More particularly, an exposed surface of interior layer 140 defines the void within upper 120, which receives both insole 123 and the foot. In general, therefore, insole 123 is located within a lower portion of upper 130 and is positioned in an area that will be adjacent to a plantar surface of the foot for enhancing the comfort of footwear 100. Interior layer 140 exhibits a configuration that is substantially similar to the configuration of interior layer 40, and edges of interior layer 140 are joined together to form seams in the same manner as interior layer 40. As with footwear 10, insole 123 effectively covers the seams in interior layer 140 (except for a substantially vertical heel seam) and separates the seams from the foot. That is, insole 123 is located within the void formed by interior layer 140, and insole 123 is positioned between the seams and the portion of the void that receives the foot. Accordingly, insole 123 provides a separation between the seams and the foot, with the exception of the heel seam.

Interior layer 140 and exterior layer 160 may be formed from any of the materials discussed above with respect to footwear 10, including various textile materials. The structure of textile materials is generally porous and permits molten polymers, for example, to infiltrate the structure of interior layer 140 and exterior layer 160. In manufacturing upper 130, exterior layer 160, for example, is placed in a mold and a polymer material is injected into the mold. The polymer material infiltrates the textile material of exterior layer 160 (i.e., the polymer material extends around the various filaments and fibers forming the yarn in the textile material) and, is permanently bonded to exterior layer 160 upon cooling. That is, the polymer material that forms intermediate layer 150 may be molded to exterior layer 160. In other embodiments of the invention, the polymer material forming intermediate layer 150 may be molded to interior layer 140. Although interior layer 140 and exterior layer 160 are generally discussed herein as being textile materials, one or both of interior layer 140 and exterior layer 160 may be formed from any material to which intermediate layer 150 may be bonded.

Suitable polymer materials for intermediate layer 150 include various polymer foams whether formed from thermoplastic or thermoset polymer materials. More particularly, intermediate layer 150 may be formed from a polyurethane foam, for example. In contrast with intermediate layer 50, therefore, intermediate layer 150 is formed from a foamed polymer material. In addition, intermediate layer 150 may be formed from multiple materials, or intermediate layer 150 may be formed from a single material with different densities in different portions of footwear 100. Accordingly, the properties of the materials forming intermediate layer 150 may also vary to change the properties of intermediate layer 150 in different portions of footwear 100. In place of the foamed polymer material, intermediate layer 150 may also be formed from sheets of rubber or thermoplastic polyurethane, for example.

The molding process described above effectively joins intermediate layer 150 to exterior layer 160. A portion of interior layer 140 is positioned adjacent to intermediate layer 150 and is also secured to intermediate layer 150 and exterior layer 160. One suitable manner of joining interior layer 140 with intermediate layer 150 and exterior layer 160 is through an adhesive bonding process. An adhesive may be applied to interior layer 140, and upon contact with intermediate layer 150 and exterior layer 160, the adhesive joins interior layer 140 to intermediate layer 150 and exterior layer 160. Alternately, the adhesive may be applied to intermediate layer 150 and exterior layer 160, or other joining techniques may be utilized (e.g., stitching or thermo-bonding).

Footwear 100 may be manufactured in a manner that is substantially similar to the manufacturing method for footwear 10. Accordingly, the edges of interior element 140 may be joined around a last, and midsole 121 may be bonded to a lower area of interior element 140. Exterior layer 160 may be formed and placed within a mold for purposes of forming intermediate layer 150. As discussed above, exterior layer 160 is placed in a mold and a polymer foam material is injected into the mold. The polymer foam material infiltrates the textile material of exterior layer 160 (i.e., the polymer foam material extends around the various filaments and fibers forming the yarn in the textile material) and, is permanently bonded to exterior layer 160 upon cooling. That is, the polymer foam material that forms intermediate layer 150 may be molded to exterior layer 160.

Figure 11:
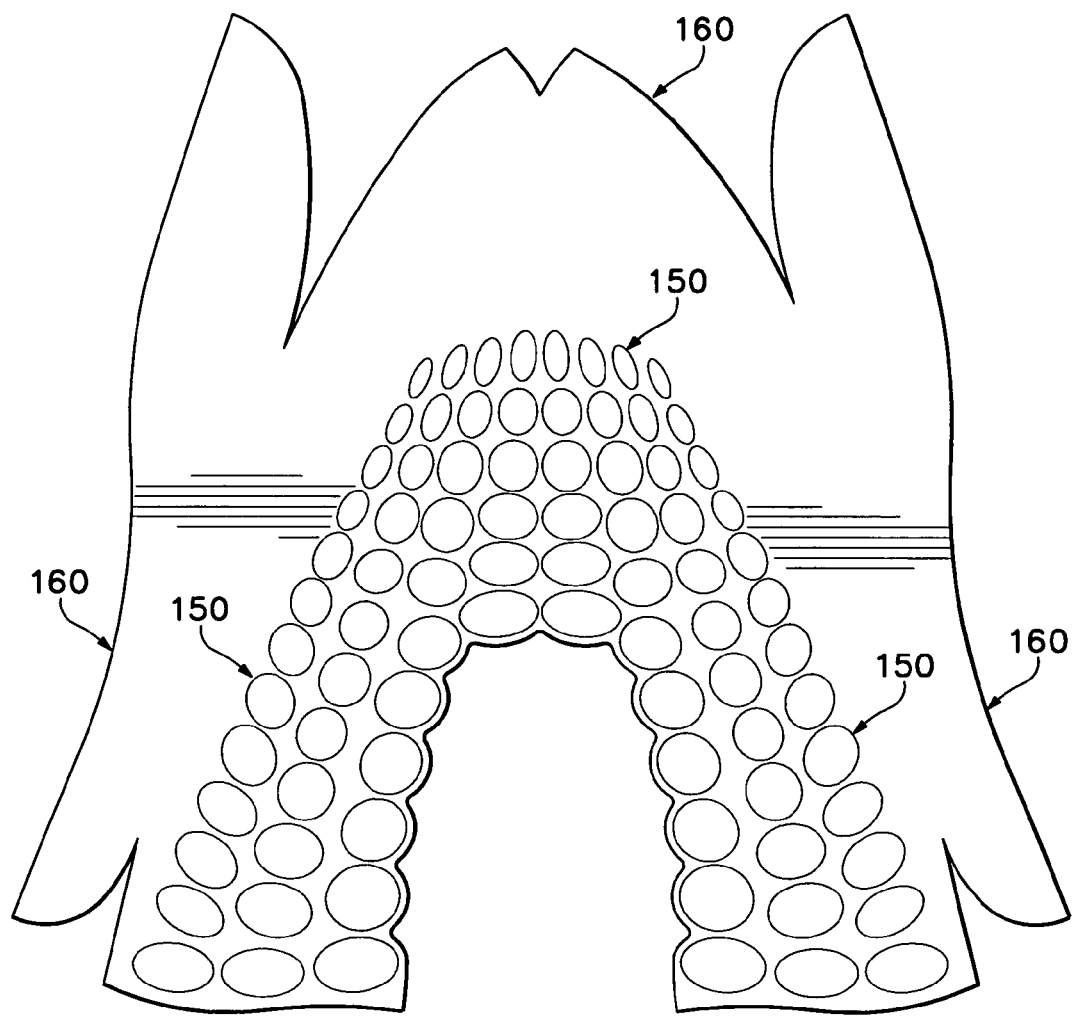
FIG. 11 is a top plan view of an intermediate layer in combination with an exterior layer.

The combination of intermediate layer 150 and exterior layer 160, as depicted in FIG. 11, is then placed over interior layer 140, which remains on the last, and portions of exterior layer 160 extend around midsole 121 to cover the lower surface of midsole 121. In order to join interior layer 140 to the combination of intermediate layer 150 and exterior layer 160, an adhesive may be applied to interior layer 140 prior to placing the combination of intermediate layer 150 and exterior layer 160 over interior layer 140. As discussed above, other methods, such as stitching and thermo-bonding, may also be utilized to join interior layer 140 to the combination of intermediate layer 150 and exterior layer 160.

Following the general procedure outlined above, outsole 122 may be bonded to portions of exterior layer 160 that extend around midsole 121. The last is then removed from the void formed by interior layer 140 and insole 123 is positioned within the void. In addition, various finishing steps may be performed to place footwear 100 in a commercially-presentable state, thereby substantially completing the manufacture of footwear 100.

Based upon the above discussion, footwear 100 is structured such that upper 130 forms a void for receiving the foot and insole 123. Upper 120 includes interior layer 140, intermediate layer 150, and exterior layer 160, and intermediate layer 150 is formed from a polymer material and molded to exterior layer 160 (or may be molded to interior layer 140). Interior layer 140 is joined with at least one of intermediate layer 150 and exterior layer 160 such that intermediate layer 150 is positioned between exterior layer 160 and interior layer 140. Sole structure 120 secured to upper 130, and exterior layer 160 extends between midsole 121 and outsole 122. In addition, interior layer 140 extends over midsole 121.

Intermediate layer 150 may have a variety of configurations within the scope of the present invention. In general, intermediate layer 150 exhibits a non-planar configuration and is, therefore, a non-planar foam material. As depicted in the figures, intermediate layer 150 has the configuration of a plurality of discrete and disk-shaped protrusions. Alternately, intermediate layer 150 may have the configuration of connected protrusions. Intermediate layer 150 may also have a plurality of other configurations within the scope of the present invention.

An advantage of the various polymer foam protrusions that form intermediate layer 150 relates to protection of the foot. Specific areas of the foot are more likely to be contacted by objects or other individuals during activities, such as athletic activities. The locations of the polymer foam protrusions may be selected, therefore, to correspond with these areas of the foot. In addition, the size, density, and thickness, for example, of the protrusions may be selected to impart varying degrees of protection in these areas. Accordingly, the configuration of intermediate layer 150 may vary significantly to impart cushioning to selected areas of upper 130. Another advantage to the various polymer foam protrusions that form intermediate layer 150 relates to aesthetics. For this reason, intermediate layer 150 may be formed to exhibit any practical and aesthetically-pleasing structure.

Although interior layers 40 and 140 are depicted in the figures and discussed in the above material as forming an interior of uppers 30 and 130, respectively, other layers or elements of material may be placed adjacent to either of layers 40 and 140 in order to form the actual interior of uppers 30 and 130. Similarly, although exterior layers 60 and 160 are depicted in the figures and discussed in the above material as forming an exterior of uppers 30 and 130, respectively, other layers or elements of material may be placed adjacent to either of layers 60 and 160 in order to form the actual exterior of uppers 30 and 130. Accordingly, the use of the terms interior and exterior is intended to provide a reference for better understanding of the information presented herein.

The present invention is disclosed above and in the accompanying drawings with reference to a variety of embodiments. The purpose served by the disclosure, however, is to provide an example of the various features and concepts related to the invention, not to limit the scope of the invention. One skilled in the relevant art will recognize that numerous variations and modifications may be made to the embodiments described above without departing from the scope of the present invention, as defined by the appended claims.

That which is claimed is:

1. An article of footwear having an upper and a sole structure, including a midsole and an outsole, secured to the upper, the upper comprising:
   a first layer of the upper;
   a second layer of the upper formed from a polymer material, the second layer being molded to the first layer and having different properties in different portions of the upper;
   a third layer of the upper joined with at least one of the first layer and the second layer such that the second layer is positioned between the first layer and the third layer; and
   wherein the third layer diverges from the first and second in a bottom region of the upper to extend over a top surface of the midsole and the first and second layers extend over a lower surface of the midsole and extend over a top surface of the outsole, wherein at least one of the first and second layers are in contact with the outsole.

2. The article of footwear recited in claim 1, wherein the first layer is a textile material, and the polymer material of the second layer infiltrates the textile material of the first layer to secure the second layer to the first layer.

3. The article of footwear recited in claim 1, wherein the third layer is joined with at least one of the first layer and the second layer in a stitchless manner.

4. The article of footwear recited in claim 1, wherein the third layer is adhesively-bonded to the first layer and the second layer.

5. The article of footwear recited in claim 1, wherein the second layer has a mesh structure.

6. The article of footwear recited in claim 5, wherein the mesh structure is a silicone material.

7. The article of footwear recited in claim 1, wherein the first layer and the second layer extend between the midsole and the outsole.

8. The article of footwear recited in claim 1, wherein the third layer extends over the midsole and between the midsole and an insole.

9. The article of footwear recited in claim 1, wherein the upper forms a void for receiving at least one of a foot and an insole, and the third layer forms an interior surface of the upper that defines substantially all of the void.

10. The article of footwear of claim 1, wherein the third layer is joined with at least one of the first layer and the second layer along a side of the upper.

11. The article of footwear of claim 1, wherein the second layer is formed of multiple materials to provide the different properties in the different portions of the article of footwear.

12. The article of footwear of claim 1, wherein the second layer is formed of a material having different densities in different regions to provide the different properties in the different portions of the article of footwear.

13. An article of footwear, comprising:
   an upper defining a void for receiving at least one of a foot and an insole, the upper having a first layer, a second layer, and a third layer, the second layer being formed from a polymer material and molded to the first layer, the second layer having a mesh structure providing stretch resistance in the plane of the upper and flexibility in other directions and the third layer being joined with at least one of the first layer and the second layer such that the second layer is positioned between the first layer and the third layer; and a sole structure secured to the upper, the sole structure including a midsole and an outsole, at least one of the first layer and the second layer extending between the midsole and the outsole and at least one of the first layer and the second layer contacting the outsole, and the third layer extending over the midsole.

14. The article of footwear recited in claim 13, wherein the third layer forms an interior surface of the upper that defines substantially all of the void.

15. The article of footwear recited in claim 13, wherein the first layer and the third layer are textile materials, and the polymer material of the second layer infiltrates the textile material of the first layer to secure the second layer to the first layer.

16. The article of footwear recited in claim 13, wherein the third layer is joined with at least one of the first layer and the second layer in a stitchless manner.

17. The article of footwear recited in claim 13, wherein the third layer is adhesively-bonded to the first layer and the second layer.

18. The article of footwear recited in claim 13, wherein the mesh structure is a silicone material.

19. The article of footwear of claim 13, wherein the third layer is joined with at least one of the first layer and the second layer along a side of the upper.

20. The article of footwear of claim 13, wherein at least one dimension of the mesh structure varies throughout the upper.

21. The article of footwear of claim 20, wherein a size of one or more openings in the mesh structure varies throughout the upper.

22. The article of footwear of claim 21, wherein the size of the one or more openings may be based on a desired degree of flexibility in a portion of the upper.

23. The article of footwear of claim 20, wherein a thickness of a segment of the mesh structure varies throughout the upper.

24. An article of footwear, comprising:
an upper defining a void for receiving at least one of a foot and an insole, the upper having a first layer, a second layer, and a third layer, the second layer having a mesh structure formed from a polymer material that is molded to the first layer and the second layer having different properties in different portions of the upper, and the third layer being joined with at least one of the first layer and the second layer such that the second layer is positioned between the first layer and the third layer; and
a sole structure secured to the upper.

25. The article of footwear recited in claim 24, wherein the third layer forms an third surface of the upper that defines substantially all of the void.

26. The article of footwear recited in claim 24, wherein the first layer and the third layer are a textile material, and the polymer material of the second layer infiltrates the textile material of the first layer to secure the second layer to the first layer.

27. The article of footwear of claim 24, wherein the third layer is joined with at least one of the first layer and the second layer along a side of the upper.

28. The article of footwear of claim 24, wherein the second layer is formed of multiple materials to provide the different properties in the different portions of the article of footwear.

29. The article of footwear of claim 24, wherein the second layer is formed of a material having different densities in different regions to provide the different properties in the different portions of the article of footwear.

30. An article of footwear, comprising:
an upper defining a void, the upper having a first layer, a second layer, the second layer having a mesh structure providing stretch resistance in the plane of the upper and flexibility in other directions, wherein at least one dimension of the mesh structure varies throughout the upper, and a third layer, the third layer being joined with at least one of the first layer and the second layer such that the second layer is positioned between the first layer and the third layer; and
a sole structure secured to the upper, the sole structure including an insole positioned with the void, the third layer forming a third surface of the upper that defines substantially all of the void, edges of the third layer being joined together to form seams, the insole being positioned between:
each of the seams except a substantially vertical heel seam; and
a portion of the void that receives the foot;
wherein the sole structure includes a midsole and an outsole, at least one of the first layer and the second layer extending between the midsole and the outsole and at least one of the first layer and the second layer contacting the outsole, and the third layer extending over the midsole.

31. The article of footwear recited in claim 30, wherein the second layer is formed from a polymer material and molded to the first layer.

32. The article of footwear recited in claim 30, wherein the first layer and the third layer are textile materials, and the polymer material of the second layer infiltrates the textile material of the first layer to secure the second layer to the first layer.

33. The article of footwear recited in claim 30, wherein the third layer is adhesively-joined with at least one of the first layer and the second layer.

34. The article of footwear of claim 30, wherein the third layer extends between the midsole and an insole.

35. The article of footwear of claim 34, wherein the third layer is substantially in contact with the midsole and the insole.

36. The article of footwear of claim 30, wherein the third layer is joined with at least one of the first layer and the second layer along a side of the upper.

37. The article of footwear of claim 30, wherein a size of one or more openings in the mesh structure varies throughout the upper.

38. The article of footwear of claim 37, wherein the size of the one or more openings may be based on a desired degree of flexibility in a portion of the upper.

39. The article of footwear of claim 30, wherein a thickness of a segment of the mesh structure varies throughout the upper.

40. A method of manufacturing an article of footwear having an upper and a sole structure including a midsole and an outsole, the method comprising steps of:
providing a first layer of an upper of the article of footwear;
molding a second layer of the upper to the first layer, the second layer having a mesh structure with different properties in different portions of the upper;
joining a third layer of the upper with at least one of the first layer and the second layer such that the second layer is positioned between the first layer and the third layer; and
in a bottom region of the upper, separating the third layer from the first and second layers and extending the third layer over a top surface of the midsole; and extending the first and second layers over a bottom surface of the midsole, at least one of the first and second layers being in contact with the outsole.

41. The method recited in claim 40, wherein the step of providing includes selecting the first layer to be a textile.

42. The method recited in claim 41, wherein the step of molding includes inducing a polymer material to infiltrate a portion of the first layer.

43. The method recited in claim 40, further including a step of positioning the first layer to be an first layer of the article of footwear, and positioning the third layer to be an third layer that defines avoid for receiving a foot.

44. The method recited in claim 43, further including a step of joining edges of the third layer to form seams, and including a step of positioning an insole within the void, the insole being positioned between:

each of the seams except a substantially vertical heel seam; and a portion of the void that receives the foot.

45. The method of claim 40, wherein the step of joining the third layer of the upper with at least one of the first layer and the second layer includes joining the third layer with at least one of the first layer and the second layer along a side of the upper.

46. The method of claim 40, wherein the second layer is formed of multiple materials to provide the different properties in the different portions of the article of footwear.

47. The article of footwear of claim 40, wherein the second layer is formed of a material having different densities in different regions to provide the different properties in the different portions of the article of footwear.

* * * * *